United States Patent
Dahlke et al.

(10) Patent No.: US 8,887,754 B2
(45) Date of Patent: Nov. 18, 2014

(54) VALVE

(75) Inventors: Rainer Dahlke, Kaarst (DE); Markus Jeziorski, Langenfeld (DE); Hans Robert Attig, Duesseldorf (DE); Jan Claussen, Wiesbaden (DE); Eva Schaeffer, Mainz (DE)

(73) Assignee: Qiagen GmbH, Hilden (DE)

( * ) Notice: Subject to any disclaimer, the term of this patent is extended or adjusted under 35 U.S.C. 154(b) by 280 days.

(21) Appl. No.: 13/381,589

(22) PCT Filed: Jun. 22, 2010

(86) PCT No.: PCT/EP2010/058810
§ 371 (c)(1),
(2), (4) Date: Mar. 16, 2012

(87) PCT Pub. No.: WO2011/000738
PCT Pub. Date: Jan. 6, 2011

(65) Prior Publication Data
US 2012/0160355 A1    Jun. 28, 2012

(30) Foreign Application Priority Data
Jun. 30, 2009 (DE) .......................... 10 2009 027 352

(51) Int. Cl.
*F16K 11/085* (2006.01)
*B01L 3/00* (2006.01)
*F16K 99/00* (2006.01)

(52) U.S. Cl.
CPC ..... *F16K 99/0001* (2013.01); *B01L 2400/0622* (2013.01); *B01L 3/502738* (2013.01); *F16K 99/0011* (2013.01); *B01L 2400/0644* (2013.01); *B01L 3/567* (2013.01); *F16K 99/0028* (2013.01); *F16K 2099/0084* (2013.01); *B01J 2219/00891* (2013.01); *F16K 99/0042* (2013.01); *B01L 2300/0816* (2013.01)

USPC ................................ 137/315.17; 137/625.47

(58) Field of Classification Search
CPC ............................. F16K 11/074; F16K 11/076
USPC ......................... 137/315.17, 625.46, 625.47
See application file for complete search history.

(56) References Cited

U.S. PATENT DOCUMENTS 4,156,437 A * 5/1979 Chivens et al. ................ 137/554
4,444,066 A * 4/1984 Ogle et al. ................. 73/863.72
(Continued)

FOREIGN PATENT DOCUMENTS

DE          27 22 363       12/1977
GB          1 195 913        3/1968
(Continued)

OTHER PUBLICATIONS

International Preliminary Report on Patentability and Written Opinion Translation (9 pages).

(Continued)

*Primary Examiner* — John K Fristoe, Jr.
*Assistant Examiner* — Reinaldo Sanchez-Medina
(74) *Attorney, Agent, or Firm* — Miles & Stockbridge, P.C.

(57) ABSTRACT

The invention relates to a system comprising a rotary valve and an actuating device for the rotary valve. The invention further relates to a related flow system having a rotary valve. The flow system is in particular a micro-flow system. The system comprises at least two separate components, wherein the one component is a rotary valve comprising a hollow cylindrical mount (2), a cylindrical valve body (5) located in the mount, and openings (3*a*, 3*b*, 3*c*, 3*d*) for at least two channels at the bottom of the mount (2). The other component comprises an actuating device (9) that is provided with pressing means, by means of which the valve body (5) can be pressed to the bottom of the mount (2).

15 Claims, 5 Drawing Sheets

(56) References Cited

U.S. PATENT DOCUMENTS

| | | | |
|---|---|---|---|
| 5,105,851 A * | 4/1992 | Fogelman | 137/625.11 |
| 5,803,117 A | 9/1998 | Olsen et al. | |
| 6,012,488 A | 1/2000 | Nichols | |
| 6,981,518 B2 | 1/2006 | Gilbert et al. | |
| 7,128,876 B2 * | 10/2006 | Yin et al. | 422/508 |
| 7,144,616 B1 | 12/2006 | Unger et al. | |
| 2003/0116206 A1 * | 6/2003 | Hartshorne et al. | 137/625.46 |
| 2008/0016891 A1 | 1/2008 | Sim et al. | |
| 2010/0269936 A1 * | 10/2010 | Tomita | 137/625.46 |

FOREIGN PATENT DOCUMENTS

| | | |
|---|---|---|
| JP | 2006183818 | 7/2006 |
| WO | 2004105829 | 12/2004 |
| WO | 2007130951 | 11/2007 |

OTHER PUBLICATIONS

International Search Report for PCT/EP2010/058810 Mailed Nov. 24, 2010.

* cited by examiner

VALVE

CROSS REFERENCE TO RELATED APPLICATIONS

This application is a §371 National Stage Application of PCT/EP2010/058810, filed Jun. 22, 2010, which claims priority to Germany Application No. 10 2009 027 352.2, Jun. 30, 2009.

BACKGROUND OF THE INVENTION

1. Field of the Invention

The invention relates to a system with a rotary valve and with an actuating device for the rotary valve. The invention relates, furthermore, to an associated throughflow system with a rotary valve. The invention relates, moreover, to a use of the claimed devices. The throughflow system is, in particular, a microthroughflow system. The transport of a liquid can be controlled by means of a throughflow system.

2. Description of Related Art

A microthroughflow system is a device with ducts, the diameter of which is smaller than 1 mm. In particular, the duct diameters have a maximum size of 150 μm. Such a microthroughflow system is usually produced, using semiconductor techniques. It is therefore also known to select semiconductors as the material for manufacturing ducts. However, other materials, such as polymers or glass, may also be employed. A microthroughflow system in the context of the present invention then comprises ducts and components which are integrated into a substrate, that is to say into a baseplate. Such a microthroughflow system may be gathered from the publication U.S. Pat. No. 7,144,616 B1.

In the pharmaceutical industry, several hundred thousand different substances are tested every day for their suitability as starting materials for novel medications. The consequence of such requirements is that there is a need for microthroughflow systems, by means of which very small liquid quantities can be handled accurately. Microthroughflow systems are also employed in industrial process engineering, in order to mix very small liquid quantities with one another quickly and uniformly. Microsystems are used in the biochemical sector for analyzing biological samples.

Microthroughflow systems have a very small and increasingly smaller build. The components used have to be correspondingly small. There is therefore a constant need for further miniaturization of the components used. Since such microthroughflow systems can regularly be employed once only, for example for carrying out an analysis, they have to be as cost-effective as possible.

A valve for opening and closing a duct is known from the publication JP 2006183818 A or from the publication US 6,981,518 B2. According to publication US 6,981,518 B2, a valve element is moved linearly with the aid of a lever in order to open or close a duct. Various components for microthroughflow systems are described in the publication "Chunsun Zhang et al., Micropumps. Microvalves, and micromixers within PCR microfluid chips: Advances and trends, Biotechnology Advances 25 (2007) 483-514, Elsevier". This publication discloses a component which serves for opening and closing a duct of a microthroughflow system. The component comprises a guide and a valve element guided in the guide. The duct connected to the guide is opened or closed by means of a linear movement. An overview of previously known valves for microfluidic throughflow systems is additionally found in J. Micromech. Microeng. 16 (2006) R13-R39, A review of microvalves, Kwang W Oh et al.. A device can be gathered from the publication WO 2004/105829 A2 which comprises a plurality of rotary valves in order thereby to connect various supply and discharge lines to one another. WO 2007/130951 A2 discloses a valve having a rotatable valve element which is located in a guide. The valve element is provided with passages and serves for the connection of duct segments which issue into the guide. Various switching states are possible.

SUMMARY

The object of the invention is to provide a system with a cost-effective rotary valve and with an actuating device for the rotary valve. An object of the invention is, furthermore, to provide an associated throughflow system having a rotary valve.

DETAILED DESCRIPTION OF A PREFERRED EMBODIMENT

The object of the invention is achieved by means of a system having the features of the first claim and by means of a throughflow system having the features of the alternative claim. Advantageous refinements may be gathered from the subclaims.

To achieve the object, the claimed system comprises at least two separate components, one component being a rotary valve which has a hollow-cylindrical holder and a cylindrical valve body located in the holder, and the other component being an actuating device provided with press means by means of which the valve body can be pressed onto the bottom of the holder. Duct issues which lead into the bottom of the holder are sealed off by pressing in this way.

The components are basically separate from one another. This is to be understood as meaning that the two components are not connected permanently to one another. They are, in particular, commercially separate units in the sense that one component with the rotary valve is a consumable which is always inserted, new, into the other component, that is to say into the actuating device. Admittedly, the component with the rotary valve can and should be inserted into the actuating device for once-only use, so that the press means can press the cylindrical valve body against the bottom of the holder during this time. However, the component with the valve is taken out again at a given time and a new component with a rotary valve is inserted. The component with a rotary valve therefore does not have its own press means with which the cylindrical valve body can be pressed against the bottom of its holder in order to seal off duct issues. The costs for the component with the rotary valve are thereby kept low. The component with the rotary valve can therefore be handled as a disposable article which is disposed of after once-only use.

In one embodiment of the invention, the press means of the actuating device is provided with latching means which can latch into depressions on the top side of the valve body. The latching means can be rotated by means of a drive of the actuating device. In this embodiment, the valve body can therefore additionally be rotated by the press means, so that, by rotation, two issuing ducts can be connected to or separated from one another with the aid of at least one elongate recess on the underside of the valve body.

Further advantages of claimed embodiments of the claimed system may be gathered from the exemplary embodiments described below.

An additional object of the invention is achieved by means of a throughflow system, in particular a microthroughflow system with a baseplate. Ducts are located in the baseplate. On the baseplate there are at least one hollow-cylindrical holder and issues of ducts which lead into the bottom of the holder. A valve body is located in the holder. The valve body is provided on the underside with at least one recess for the liquid-conducting connection of duct issues. The throughflow system does not comprise any press means for pressing the valve body against the bottom of its holder. By the valve body being rotated in the holder, issues are connected to one another such that liquid can flow through a recess from one duct into another. This connection between two ducts can also be broken again by further rotation.

When the valve body is inserted completely into the holder, the margin of the holder is preferably flush with the top side of the valve body. The top side therefore does not project with respect to the holder, and vice versa. The valve body is thus, on the one hand, encased protectively by the holder. On the other hand, the holder also has no projecting margin which could easily break off and ultimately would be superfluous.

Further advantages of claimed embodiments may be gathered from the following description.

Figure 1:
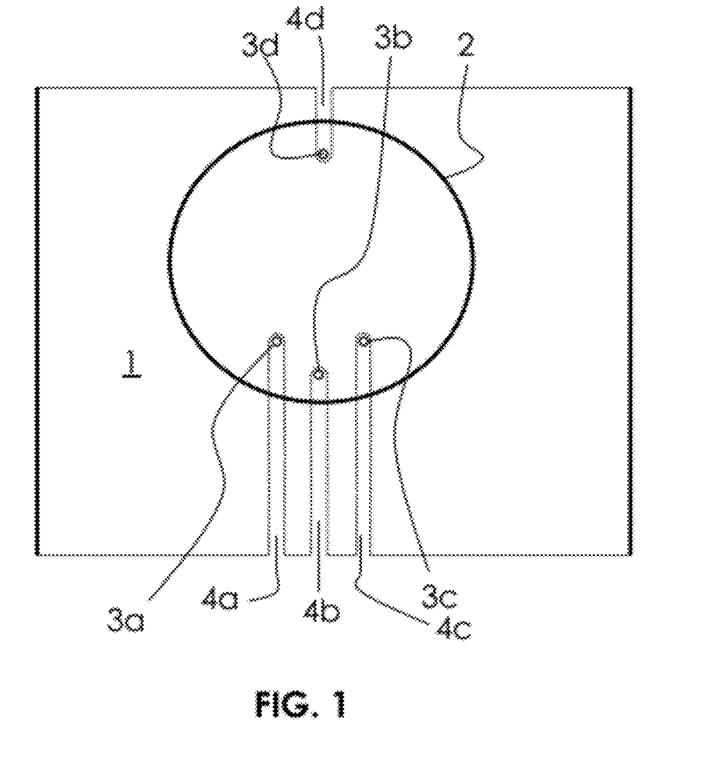
FIGS. 1-6 depict embodiments of the present invention as described herein.

FIG. 1 shows a top view of a detail of a throughflow system composed of a baseplate 1 on which a hollow-cylindrical holder 2 for a valve body is located. Located at the bottom of the holder 2, that is to say on the surface of the plate 1, are bores 3a, 3b, 3c and 3d which lead to ducts 4a, 4b, 4c and 4d. The ducts therefore issue into the bottom of the holder 2 via the bores. The ducts 4a, 4b, 4c and 4d are located inside the baseplate 1. The course of the ducts is indicated by dashed lines. The ducts are part of a microfluidic system.

Figure 2:
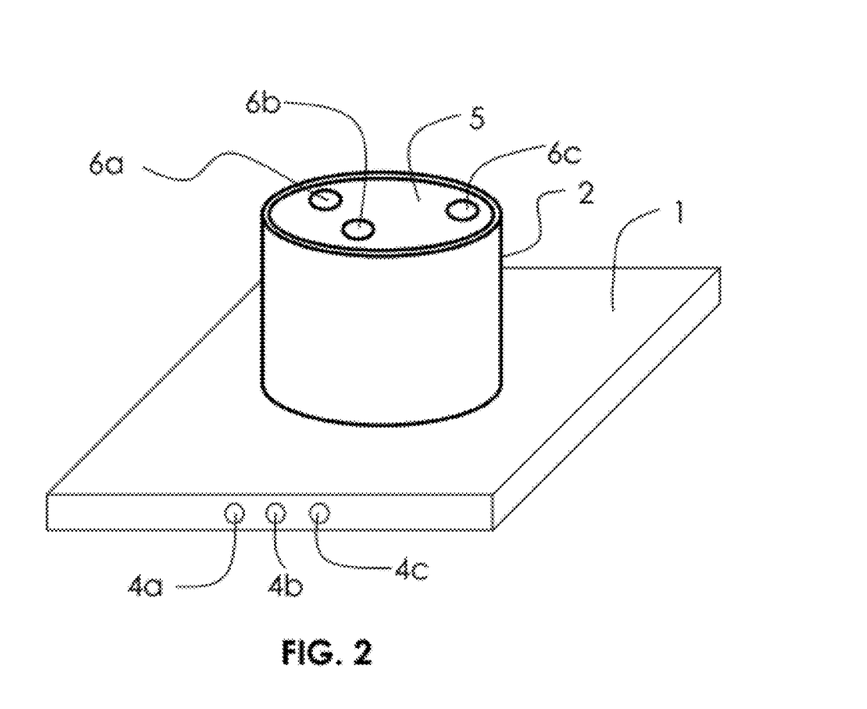

FIG. 2 shows a detail of the throughflow system with the baseplate 1 and with the holder 2 in a perspective illustration. A cylindrical valve body 5 inserted into the holder 2 is additionally illustrated. The cylindrical valve body is pressed against the bottom of the holder and seals off at least the bores 3a, 3b, 3c and 3d such that liquid cannot infiltrate into the holder 2 or emerge from this. The underside of the cylindrical valve body 5 is provided with groove-shaped recesses. The cylindrical valve body 5 can be rotated inside its holder. Depending on the position of the cylindrical valve body 5, said recesses connect, for example, two bores to one another, so that liquid can pass from one duct issuing into the holder into another issuing duct.

The holder 2 for the valve body 5 does not comprise any means for pressing the valve body against the bottom of the holder. Instead, an external actuating device is provided which presses the valve body 5 against the bottom of the holder 2. For this purpose, the throughflow system has to be inserted into the actuating device and the latter activated correspondingly. The set-up illustrated in FIG. 2 is correspondingly cost-effective and, in particular, constitutes a disposable article.

Figure 3:
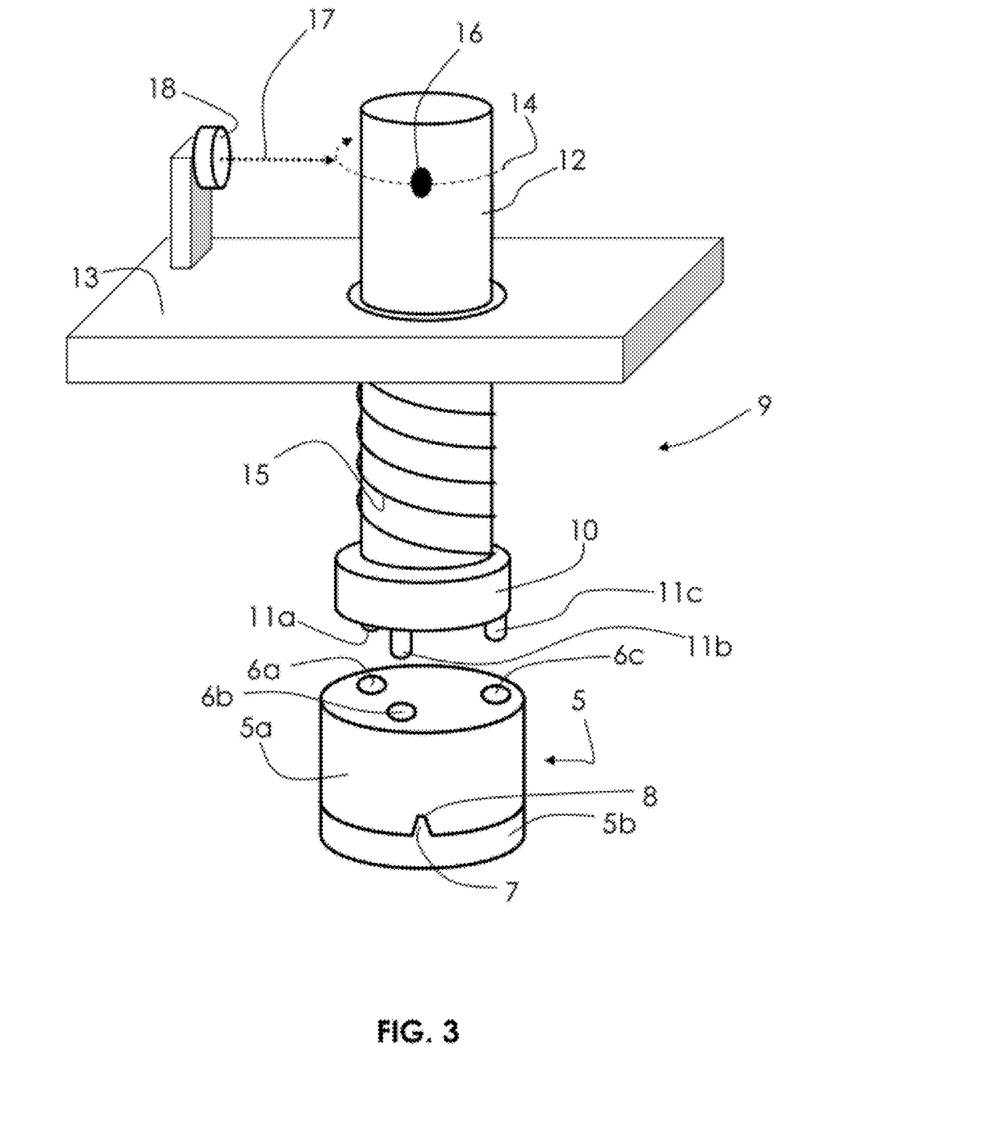

In FIG. 3, a perspective illustration of the cylindrical valve body 5 can be seen, which, in the embodiment shown, is composed of an upper cylindrical region 5a which forms a relatively hard incompressible material and of a lower disk-shaped region 5b made from a relatively soft compressible material. Three depressions in the form of bores 6a, 6b and 6c lead into the upper region, but do not reach as far as the lower disk-shaped region 5b. The upper cylindrical region is, for example, glued to the lower disk-shaped region 5b. Moreover, one or more noses 7 of the lower disk-shaped region 5b project into slots 8 of the upper cylindrical region 5a, in order thereby to ensure that the two regions 5a and 5b are connected to one another fixedly in terms of rotation.

FIG. 3 shows, further, an actuating device 9 by means of which the valve body is actuated when the latter has been inserted into a holder 2, as shown in FIG. 2. The actuating device comprises a disk 10 which serves as a ram and which is provided with three bolts 11a, 11b and 11c. The three bolts 11a, 11b and 11c are arranged and dimensioned such that they can be plugged or latched into the three bores 6a, 6b and 6c by the disk being lowered in relation to the valve body. The three bores 6a, 6b and 6c and therefore also the three bolts 11a, 11b and 11c are not arranged in a rotationally symmetrical manner. There is therefore only exactly one possible position for the three bolts 11a, 11b and 11c in relation to the three bores 6a, 6b and 6c so that the bolts can be moved into the bores. The disk 10 is firmly connected to a lower end of a rod 12 which reaches through a circular orifice in a plate 13. The upper end of the rod 12 is connected to a drive, not illustrated, by means of which the rod can be rotated about its longitudinal axis, as indicated by the arrow. Moreover, the rod 12 is surrounded by a spring 15. The spring 15 is located between the disk 10 and the plate 13. When the plate 13 is lowered downward in the direction of the valve body 5, the spring 15 is thereby tensioned correspondingly if the three bolts 11a, 11b and 11c are placed on the valve body 5 or are latched in the three bores 6a, 6b and 6c of the valve body 5. The rod 12 is preferably secured against stripping out of the circular orifice of the plate 13. This may be achieved, for example, by means of an annular widening, not illustrated, of the rod or an enlarged diameter of the rod above the plate 13.

The pretensioned spring presses the valve body 5 onto the bottom of the holder 2, that is to say onto the corresponding top side of the baseplate 1, if the three bolts 11a, 11b and 11c are latched in the three bores 6a, 6b and 6c of the valve body 5. With sufficiently high pressure, the lower relatively soft region 5b seals off the four bores 3a, 3b, 3c and 3d located on the bottom of the holder 2, such that no liquid coming from the ducts 4a, 4b, 4c and 4d can pass outward through the bores 3a, 3b, 3c and 3d.

If the rod 12 is secured against falling out, the spring 15 may be pretensioned even when the device 9 is not yet acting upon a valve body 5.

By the distance between the plate 13 and the valve body 5 being regulated, the pressure with which the valve body is pressed against the bottom of the holder 2 is controlled. The pressure is exerted by the spring 15, without a corresponding counterpressure upon the drive for the rod having to be taken into account. This advantageously reduces wear phenomena in the drive.

When the device 9 is moved in the direction of the valve body 5, the three bolts 11a, 11b and 11c are usually placed first nearly on the top side of the valve body. The plate 13 is then lowered in a suitable way in the direction of the valve body 5, so that the spring 15 is thereby (further) pretensioned and the three bolts 11a, 11b and 11c are pressed correspondingly more firmly against the top side of the valve body. The rod 12 is rotated by means of the drive, the result of this being that the corotating three bolts 11a, 11b and 11c finally come into alignment with the three bores 6a, 6b and 6c which are located on the top side of the valve body 5. When this position of the three bolts 11a, 11b and 11c in relation to the three bores 6a, 6b and 6c is reached, the three bolts 11a, 11b and 11c latch into the three bores 6a, 6b and 6c. Rotation of the rod 12 then causes corresponding rotation of the valve body in the holder 2.

When the three bolts 11a, 11b and 11c are located in the three bores 6a, 6b and 6c in the intended way, a marking formed on the rod 12 is located level with a laser beam 17 which is generated by a laser diode 18. The marking 16 reflects the laser light 17 differently, as compared with the remaining adjacent region of the rod. The rod is therefore composed, for example, of a highly reflective metal. A black spot constitutes a relatively poorly reflecting marking. The reflection of the laser light by the rod is detected by a sensor, not illustrated, and is evaluated by an evaluation unit. If this reflection changes because the laser light 17 impinges onto the marking 16 instead of onto other regions of the rod 12, this means, during operation, that the three bolts 11a, 11b and 11c are latched in the intended way into the three bores 6a, 6b and 6c. Moreover, the exact position of the valve body in relation to the holder 2 is thus known. If, therefore, the changed reflection is detected, the device recognizes from this both the position of the three bolts 11a, 11b and 11c and the position of the valve body inside the holder 2.

If, by contrast, the three bolts 11a, 11b and 11c are still located outside the three bores 6a, 6b and 6c and therefore press nearly onto the top side of the valve body 5 on account of a correspondingly lowered plate 13, the marking 16 is not located level with the laser beam 17, for example because the laser is connected firmly to the plate 13, as shown in FIG. 3. The marking then cannot be detected. The device 9 consequently recognizes that the three bolts 11a, 11b and 11c are not yet latched in the intended way into the three bores 6a, 6b and 6c.

The marking 16 is dimensioned and arranged such that the desired information can be obtained, as described, by detecting and evaluating the reflection of the laser beam.

Instead of a laser, a detector for reflected laser light and a marking, other means may also be provided for determining the position of the rod. Thus, for example, a notch may be provided instead of a differently reflecting marking. If a tracer which presses against the rod is used, the tracer can detect when the notch is reached. In that case, the disadvantage is that the detection of a notch does not take place contactlessly.

If the drive for the rod has a motor which at the same time allows angle measurement, a marking or groove which runs annularly around the rod may be provided instead of a spot-shaped marking 16 or a corresponding notch. However, such a motor is relatively costly, and therefore the embodiments outlined above with a spot-shaped marking or notch are preferable.

Figure 4:
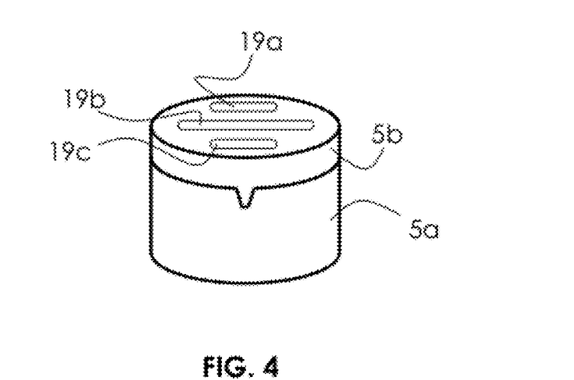

FIG. 4 shows the underside of the valve body 5. This comprises three elongate recesses 19a, 19b and 19c. The elongate recesses 19a, 19b and 19c connect bores 3a, 3b, 3c and 3d on the bottom of the holder 2 to one another in a liquid-conducting manner when the position of the valve body 5 inside the holder has been set correspondingly. If rotation is carried out, starting from this position, liquid-conducting connections of bores 3a, 3b, 3c and 3d are cancelled and/or changed.

Instead of the four ducts 4a, 4b, 4c and 4d shown in FIG. 1, more or fewer ducts may also issue into the bottom of the holder 2 with the aid of bores. In order to act as a valve, at least two ducts issue into the holder. At what location bores are arranged inside a holder for a valve body depends on the number, arrangement and/or course of recesses 19a, 19b, 19c which are provided on the underside of the valve body 5. The course of the ducts 4a, 4b, 4c and 4d shown in FIG. 1 is only one example. The ducts may also issue into the holder 2 inside the baseplate differently, thus, for example, arcuately.

It is advantageous, admittedly, to provide three bores 6a, 6b and 6c on the top side of the valve body and three associated bolts 11a, 11b and 11c in the actuating device 9. A torque can thus be transmitted from the actuating device to the valve body, without fear of tilting. This applies particularly when the bores are grouped around a mid-axis of the valve body, specifically, preferably, as illustrated, near the margin of the top side of the valve body. However, for example, only two bores in addition to associated bolts may also be provided. Undesirable tilts may however then occur more easily during operation. Only four or more bores in addition to associated bolts may also be provided. However, this increases the outlay in structural terms, without entailing an appreciable advantage. Moreover, a larger number of bores basically increases the space requirement, which is contradictory to the endeavor toward miniaturization.

Instead of bolts in addition to bores, other means may also be provided for gripping a valve body with the aid of an actuating device. Thus, a valve body 5 inserted into a holder 2 may project upward out of the holder and be shaped, for example, triangularly in this region. This triangular shape can then be gripped with the aid of a corresponding triangular frame of an actuating device in order to rotate the valve body. However, such an embodiment basically increases the height of the valve body in a disadvantageous way.

Instead of a spring 15 together with a disk 10 and plate 13, other or differently shaped means may also be provided for pressing the valve body suitably against the bottom of a holder 2 by means of an external device. Thus, instead of a plate, for example, a ring or ring segments pressing upward against the spring 15 may be provided. Instead of a disk 10, differently shaped holding elements for a spring 15 may be provided at the lower end of the rod 12. Also, a means, such as the disk 10, together with the bolts 11a, 11b, 11c with which a valve body 5 is gripped, does not have to be pressed against the valve body. Instead, for example, a ring or one or more ring segments may be arranged around a disk 10 and are pressed against the top side of a valve body 5 during operation, in order thereby to press the valve body onto the bottom of a holder 2. However, such a set-up is basically somewhat more complex and tends to require a large base area on the top side of a valve body 5.

The valve body is preferably produced by means of two-component injection molding when it is composed of two different materials. However, the valve body may also be manufactured in one piece from one material. The material must then be selected such that, on the one hand, it can seal off the bores of the holder and, on the other hand, it is sufficiently hard to be able to transmit a pressure force and rotational movements in a suitable way. The selection of material is in any event simpler and more possible materials are available when an upper cylindrical region is hard in comparison with a lower disk-shaped region of the valve body. The hard upper region ensures that forces and pressures are suitably transmitted downward. The lower relatively flat soft region ensures the desired sealing off.

The valve body preferably latches in a holder so as thereby to be secured against falling out inadvertently from the holder. Thus, above all, undesirable soiling which can falsify an analysis is avoided on the bottom of the holder. Alternatively or additionally, a valve body may be held in its holder by means of a press fit, although this has the disadvantage of increasing the frictional forces to be overcome during a rotational movement.

A microthroughflow system comprises, as a rule, a plurality of holders together with valves. As a rule, the baseplate or the substrate of a microthroughflow system has integrated in it, in addition to ducts, one or more chambers in which substances for carrying out analyses and/or agitators, such as rods of a magnetic stirrer, may be located. The microthroughflow system usually comprises, furthermore, one or more connections via which liquids can be introduced into ducts.

If the microthroughflow system comprises an agitator, such as, for example, a rod of a magnetic stirrer, the actuating device is preferably provided with means by which the agitator can be driven when the throughflow system is inserted into the actuating device. A method of analysis can thus be carried out especially simply solely with the aid of the actuating device.

So that an analysis can be carried out completely in the actuating device, the latter comprises, in one embodiment, heating and/or cooling means so that liquids can be suitably heated or cooled. This is the case, for example, when a polymerase chain reaction (PCR) is to be carried out inside the throughflow system.

Figure 5:
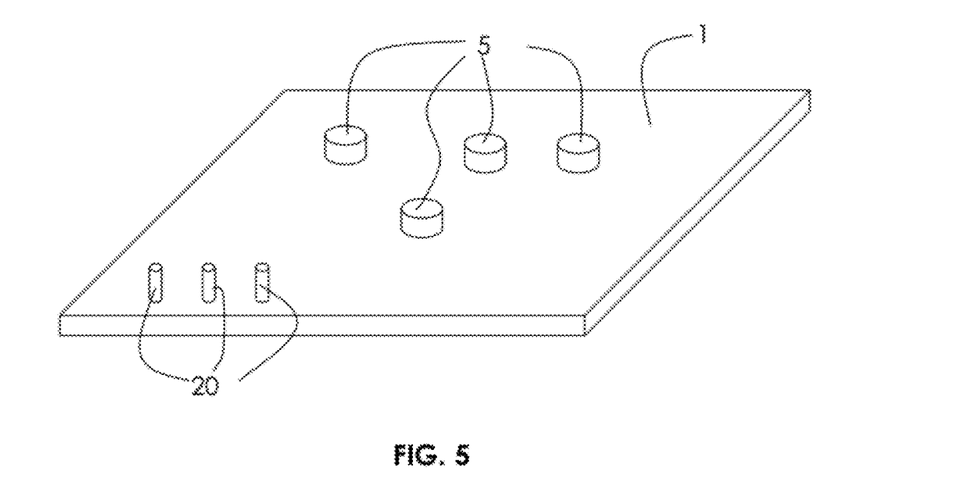

FIG. 5 shows an example of a typical microthroughflow system. This comprises a plurality of valve bodies 5 which are located in holders. In addition, there are connections 20, onto which, for example, hoses can be plugged so that liquids can be introduced into ducts of the microthroughflow system. The baseplate is, for example, no thicker than one or two millimeters. The base area of the baseplate amounts, for example, to no more than 400 cm$^2$, preferably to no more than 200 cm$^2$. For cost-effective manufacture, the baseplate, together with holders and supply lines, is composed of a plastic and has been produced, in particular, by injection molding. An especially large-volume chamber which serves for the reception of consumable material may be provided on the baseplate. A duct issues into this chamber. The chamber is otherwise closed completely. If chemical or biological waste is collected here, this dependably cannot escape outward, which can result in undesirable contamination.

Figure 6:
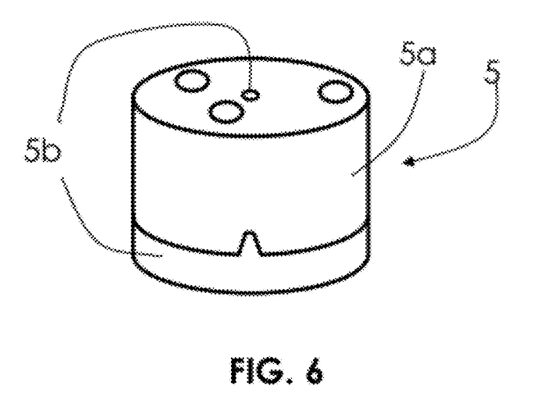

FIG. 6 shows an embodiment of the valve body 5. The material of the low region 5b extends along a central duct through the harder region 5a and thus becomes visible on the top side of the valve body 5. Starting from this duct, pegs preferably extend horizontally into the hard material (not illustrated). The rotationally fixed connection between the hard and the soft material is thus ensured in an improved way.

The invention claimed is:

1. A system comprising at least two separate components, one component being a rotary valve which has a hollow-cylindrical holder, a cylindrical valve body located in the holder and issues of at least two ducts on the bottom of the holder, and the other component being an actuating device provided with press means by means of which the valve body can be pressed onto the bottom of the holder, wherein the two components are not connected permanently to one another, wherein the press means comprises a pretensioned spring which is arranged between a holding means of the actuating device and a movably mounted ram, the ram being dimensioned and arranged such that it can press the valve body against the bottom of the holder; and wherein the position of the holding means is adjustable so that the pressure force can be regulated.

2. The system as claimed in claim 1, wherein the press means of the actuating device is provided with latching means which can latch into depressions on the top side of the valve body and the latching means can be rotated by means of a drive of the actuating device, and wherein the valve body has on its underside at least one elongate recess, wherein the latching means comprises at least two projections that engage with the depressions upon actuation of the actuating device.

3. The system as claimed in claim 1, wherein the ram is fastened to a rod and the rod is provided with a drive means by means of which the rod can be rotated in an automated manner.

4. The system as claimed in claim 3, wherein the rod has detector means so that the position of the rod in relation to the valve body can be determined when the component with the rotary valve is inserted into the actuating device.

5. The device as claimed in claim 1, which is capable of being used for chemical, biological and/or medical analysis.

6. A throughflow system with a baseplate, with ducts located in the baseplate, with at least one hollow-cylindrical holder on the baseplate, with issues of ducts into the bottom of the holder, and with a rotatable valve body which is located in the holder and which is provided on the underside with at least one recess for the liquid-conducting connection of duct issues, the throughflow system not comprising any press means for pressing the valve body against the bottom of the holder, wherein the throughflow system is disposable wherein the valve body comprises depressions on the top side of the valve body for accepting a latching means on a press means of an actuating device, wherein the press means comprises a pretensioned spring which is arranged between a holding means of the actuating device and a movably mounted ram, the ram being dimensioned and arranged such that it can press the valve body against the bottom of the holder; and wherein the position of the holding means is adjustable so that the pressure force can be regulated.

7. The throughflow system as claimed in claim 6, wherein the margin of the holder is flush with the top side of the valve body.

8. The throughflow system as claimed in claim 6, wherein the valve body is composed of a hard cylindrical upper region and of a soft lower disk.

9. The throughflow system as claimed in claim 6, wherein the top side of the valve body is provided with three bores.

10. The throughflow system as claimed in claim 9, wherein the three bores are distributed non-symmetrically on the surface.

11. The throughflow system as claimed in claim 6, wherein the baseplate is provided with at least one chamber.

12. The throughflow system as claimed in claim 11, wherein an agitating means is present in a chamber.

13. The throughflow system as claimed in claim 6, wherein the baseplate is not more 2 mm in depth.

14. The throughflow system of claim 6, wherein the throughflow system is a microthroughflow system.

15. The throughflow system as claimed in claim 6, wherein the baseplate is not more than 1 mm in depth.

* * * * *